3,388,309
VOLTAGE REGULATOR INCLUDING ISOLATION BETWEEN INPUT AND OUTPUT
Frank H. Banks, Webster, N.Y., and David W. Patterson, Huntsville, Ala., assignors to Radio Corporation of America, a corporation of Delaware
Filed Dec. 27, 1965, Ser. No. 516,225
2 Claims. (Cl. 321—2)

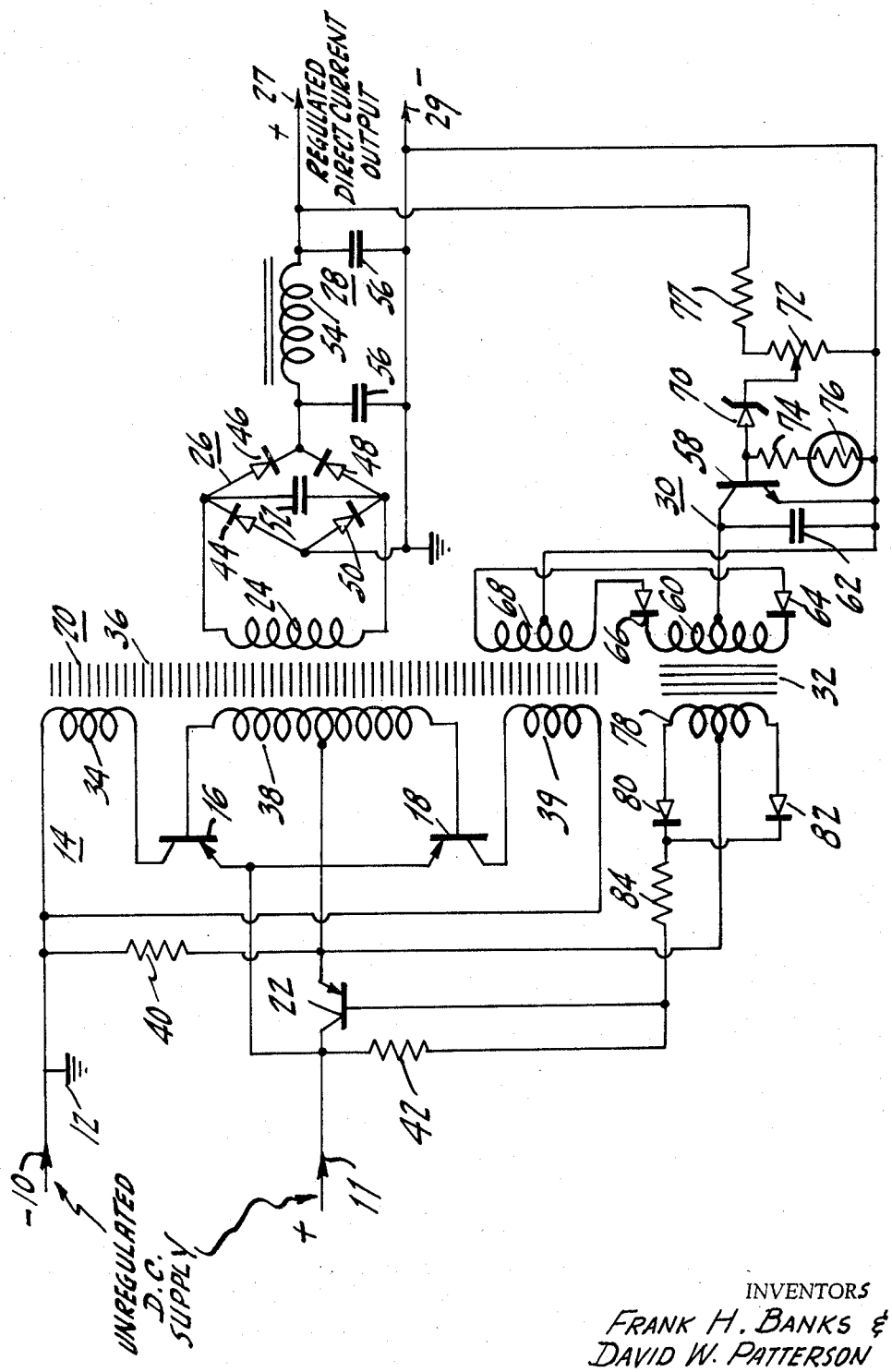

ABSTRACT OF THE DISCLOSURE

A regulated voltage supply is provided. The unregulated source of voltage supplies an inverter whose output is transformer coupled to a rectifier. The voltage of the rectifier is compared with a standard voltage and the difference voltage controls an alternating current. This alternating current is transformer coupled to a rectifier which controls the power supply of the inverter. Since there is no direct current connection between the unregulated source and the regulated output, the source and the output may be grounded independently of each other.

---

This invention involves a sources of voltage regulated output current supplied by an unregulated source of input current in which one side of the regulated output means and one side of the unregulated input means may each be grounded at any convenient point independently of the grounding of the other.

In many services, such as mobile service where the unregulated supply, which serves as the input to a voltage regulator may be a battery-generator combination having one terminal grounded by the maker of the vehicle, it may be necessary to ground a point of different voltage or polarity at the output of the voltage regulator. Known regulators, particularly, those employing some type of feedback control exhibit a lack of direct current isolation between the output and input of the regulator, making the completion of such grounding connections albeit necessary difficult and often impossible.

It is an object of this invention to provide a voltage regulator supplied by an unregulated source in which a point in the supply for the regulator and a point in the regulator itself may each be grounded without regard or consideration of the grounding of the other.

It is an object of this invention to provide an improved voltage regulator suitable for mobile services in which a ground point in the supply to the voltage regulator may be fixed by the manufacturer of the vehicle and in which any point in the output of the voltage regulator may be independently grounded.

In accordance with the invention, a directifier or inverter is supplied from an unregulated source, a terminal of which may or may not be grounded, through a current regulating element exhibiting controllable variable resistance. The alternating current output of the inverter is applied through a transformer to a rectifier. The voltage of the rectified current is used to regulate an alternating control current. The regulated alternating control current is applied to control the conductivity of the current regulating element by way of a second transformer. Since the unregulated source is completely isolated from a direct current standpoint, from the output of the regulator, any point on the unregulated source may be grounded and any point on the regulator beyond the two transformers may be grounded and neither grounding will affect the other.

The invention will be more fully understood from the following explanation when taken with the accompanying drawing in which:

The sole figure is a circuit diagram of an apparatus including one embodiment of this invention.

In the sole figure an unregulated direct current input source (not shown) is connected between the input terminals 10 and 11. This unregulated input source may comprise a battery and a generator connected thereacross for charging it. The battery may provide 12.6 volts across its terminals when not being charged from 14–16 volts across its terminals when being charged. The negative terminal 10 may be grounded as indicated by reference character 12. The direct current supplied by the battery is inverted by an inverter 14 comprising two transistors 16 and 18 and a saturable core transformer 20, fed from the terminals 10 and 11 through a current regulating transistor 22 whose conductivity is varied by a current applied between two electrodes thereof. The alternating current provided by the inverter 14 and appearing in a secondary winding 24 of the transformer 20 is rectified in a full wave rectifier 26. The direct current output of the full wave rectifier 26 is smoothed in the filter 28, and the voltage output of the filter 28 is compared with a standard voltage by means of a voltage comparison device 30. The comparison device 30 controls the amplitude of an alternating current passing through the primary winding of a transformer 32, for example, an unsaturable iron core transformer. The current appearing at the secondary winding of the transformer 32 is rectified and applied to control the conductivity of the current regulating transistor 22, to control the current fed to the inverter 14 from the unregulated source and therefore to regulate the output voltage appearing across the pair of terminals 27 and 29 of the filter 28. Since the input and part of the regulating means comprising the inverter 14 and the regulating transistor 22 are transformer isolated for direct voltages by the transformers 20 and 32 from the output including the rectifier 26, the filter 28 and the regulating device 30, any convenient point on the power input side of the transformers 20 and 32 may be grounded without regard to the grounding of the elements on the power output side of the transformers 20 and 32.

A more detailed explanation of the regulator is as follows:

The unregulated direct current supply or input which is connected between the terminals 10 and 11 provides current for the inverter 14. The inverter 14 comprises two PNP transistors 16 and 18 whose emitters are connected together. The collector of the transistor 16 is connected to the negative terminal 10 of the supply through a primary winding 34 of the saturable core transformer 20 which may be bifilarly wound. The transformer 20 includes a saturable core 36. The base of the transistor 16 is connected to an end terminal of a center tapped secondary winding 38 of the transformer 20. The other end terminal of the secondary winding 38 is connected to the base of the transistor 18 whose collector is connected through a second primary winding 39 to the negative terminal 10 of the supply. The positive terminal 11 of the supply is connected to the emitters of the transistors 16 and 18 and to the collector of the regulating transistor 22 whose emitter is connected to the center tap of the secondary winding 38. The emitter of the transistor 22 is also connected to the negative terminal 10 of the source through a resistor 40, and the collector and base of the transistor 22 are connected together by a resistor 42.

The full wave rectifier circuit 26 comprises four diodes 44, 46, 48 and 50. The cathode of the diode 44 and the anode of the diode 46 are connected to one terminal of the secondary winding 24 of the transformer 20 and the anode of the diode 48 and the cathode of the diode 50 are connected to the other terminal of the secondary winding 24. A capacitor 52, which prevents the occurrence of spike voltages in the primary winding of the transformer 20, is connected across the terminals of the secondary winding 24. The remaining terminals of the diodes 44 and 50 are connected to ground and to the negative output terminal 29 of the described regulator. The other terminals of the diodes 46 and 48 are connected to the positive output terminal 27 of the described regulator through the filter 28 comprising a series smoothing inductor 54 and a pair of smoothing capacitors 56 which are connected between respective terminals of the inductor 54 and ground.

Assuming that the regulating transistor 22 is unvaryingly conductive and that the voltage of the input source and the load on the inverter appearing at the output terminals 27 and 29 are each unvarying, the inverter 14 will provide a substantially constant frequency alternating current output of a relatively constant voltage and the output voltage of the regulator at the output terminals 27, 29 will be unvarying. However, if the load at the terminals 27, 29 varies, the inverter 14 will be required to provide more or less alternating current output. Due to IR voltage drops in the circuit, and due to the inherent operation of the inverter 14 in which both the voltage and frequency may vary as the load thereon varies, the voltage at the output of the described regulator will decrease as the load increases, and vice versa. To minimize or prevent variations of the voltage at the output terminals due to such change in load, a regulating means 30 is provided to control the conductivity of the regulating transistor 22 to thereby control the supply of current provided for the inverter 14 by the direct current input supply.

The regulating means 30 includes a NPN transistor 58 whose emitter is grounded and whose collector is connected to the center tap of the primary winding 60 of the transformer 32. The collector of the transistor 58 is also connected to ground through a capacitor 62. The end terminals of the primary winding 60 are respectively connected to the cathodes of diodes 64 and 66 whose anodes are respectively connected to the terminals of an additional secondary winding 68 of the transformer 20. The center tap of the secondary winding 68 is connected to ground and output terminal 29. The base of the transistor 58 is connected through a Zener diode 70 to a tap on a potentiometer 72. The base of the transistor 58 is also connected to ground through a resistor 74 and a temperature variable resistor 76 in series. A current limiting resistor 77 is connected between the positive output terminal 27 of the regulator and a terminal of the potentiometer 72 whose other terminal is connected to ground.

The center tap of the secondary winding 78 of the transformer 32 is connected to the emitter of the series regulating transistor 22. The end terminals of the winding 78 are connected to the anodes of respective diodes 80 and 82 and the cathodes of these diodes are connected together and through a resistor 84 to the base of the series regulating transistor 22.

In operation of the described regulator, the voltage at the positive output terminal 27 is applied across the potentiometer 72 and a predetermined portion of this voltage is applied through the Zener diode 70 across the series resistors 74 and 76. This predetermined portion is applied between the base and emitter of the transistor 58 to make it more or less conductive dependent on current flow applied between the base and emitter of the transistor 58. The voltage induced across the transformer secondary 68, which is full wave rectified by the diodes 64 and 66 and smoothed by the capacitor 62 is applied across the collector and emitter of the transistor 58. Therefore, the current flow in the two halves of the primary winding 60 is controlled in amount by the conductivity of the transistor 58, which in turn is controlled by the voltage in excess of the breakdown voltage of the Zener diode 70, that is applied to the base of the transistor 58, this excess voltage appearing across the resistors 74 and 76 in series. The control current applied to the transistor 58 is therefore a measure of the difference of the voltage appearing across the output terminals 27, 29 and the reference or breakdown voltage of the Zener diode 70. While a direct current is applied to the collector of the transistor 58, an alternating current appears across the terminals of primary winding 60 and therefore an alternating current appears across the secondary winding 78. The voltage appearing across the secondary winding 78 is rectified by diodes 80 and 82 and is applied as a direct current between the emitter and base of the transistor 22 to control the current provided from the unregulated source to the inverter 14. The result is that the voltage appearing across the Zener diode 70 is regulated at a value just greater than its breakdown voltage and therefore the voltage across the output terminals 27, 29 is regulated at a value determined by the position of the slider on the potentiometer 72. The temperature responsive resistor 76 varies in resistance value with change in temperature in a manner to make the operation of the described voltage regulator substantially independent of the temperature thereof. Since no direct current connection is necessary, for the operation thereof, between the output terminals 27 and 29 and the input terminals 10 and 11 of the described regulator, either of the output terminals 27 or 29 and either of the input terminals 10 or 11 may be grounded without causing injury to the described regulator.

Variations may be made in the described regulator within the spirit of the invention. For example, three taps including a center tap may be supplied for the transformer secondary winding 24, and a center top may be connected to ground and the other taps may respectively be connected to the anodes of the diodes 64 and 66 whereby the secondary winding 68 may be omitted. Therefore, the foregoing description is to be taken as illustrative and not in a limiting sense.

What is claimed is:

1. A voltage regulator having independently groundable input and output connections, said regulator comprising:

a current regulating transistor, an inverter comprising a pair of transistors and a saturable core transformer having a plurality of primary and secondary windings and connections between said windings and said transistors, means for connecting said inverter across a pair of terminals of an input source of an unregulated direct current through said current regulating transistor, a rectifier having input and output terminals, means for connecting a secondary winding of said transformer across the input terminals of said rectifier, a voltage reference device, a fourth transistor, means to apply a predetermined portion of the direct voltage appearing across the output terminals of said rectifier across said voltage reference device, means to control the conductivity of said fourth transistor by a voltage which is a measure of the difference between said predetermined portion of said direct voltage and the reference voltage provided by said voltage reference device, a second transformer, means to apply a voltage derived from a secondary winding of said first mentioned transformer as an operational bias voltage for said fourth transistor in series with the primary winding of said second transformer, and means to rectify the voltage across the secondary winding of said second transformer and to apply the output of said last mentioned voltage rectifier to control the conductivity of said regulating transistor, whereby the voltage output of said first mentioned rectifier is regulated and whereby a point on said input source and on the output of said first mentioned rectifier may be independently grounded.

2. A voltage regulator having independently groundable input and output connections comprising a saturable core transformer having two primary windings and at least two center tapped secondary windings, a pair of transistors, the emitters of said transistors being connected together with the bases of said transistors being connected together through the end terminals of one of said center tapped secondary windings, the collectors of said transistors being connected to one terminal of a source of unregulated direct current through respective primary windings, a current regulating transistor, a center tap of said one secondary winding being connected to the other terminal of said source through a pair of electrodes of said regulating transistor, a rectifier having alternating current input terminals and direct current output terminals, means for connectiing said rectifier input terminals across a secondary winding of said transfromer, a Zener diode, a fourth transistor having a pair of main electrodes and a control electrode, a resistor, means for applying a predetermined portion of the voltage appearing across the direct current output terminals of said rectifier across said Zener diode in series with said resistor, means for connecting said resistor between a main electrode and the control electrode of said fourth transistor, a second transformer having a primary and a secondary winding each having a center tap, means for connecting the end terminals of said second secondary winding having a center tap of said first mentioned transformer respectively to the end terminals of the primary winding of said second transformer through respective rectifier elements and for connecting the center tap of said second secondary winding of said first transformer and said center tap of said primary winding of said second transformer respectively to the two main electrodes of said fourth transistor, means to connect the end terminals of the secondary winding of said second transformer together through two rectifier elements connected and poled in series opposition in the loop comprising said last mentioned secondary winding and said last mentioned rectifier elements, and means for connecting a point between said last mentioned rectifier elements and the center tap on the secondary winding of said second transformer to respective electrodes of said regulating transistor, one of said respective electrodes being a control electrode.

References Cited

UNITED STATES PATENTS

| | | |
|---|---|---|
| 2,843,745 | 7/1958 | Smith. |
| 3,004,206 | 10/1961 | Sheffet _____ 321—2 |
| 3,320,510 | 5/1967 | Locklair _____ 321—2 |

FOREIGN PATENTS 1,300,882  7/1962  France.

JOHN F. COUCH, *Primary Examiner.*

W. H. BEHA, JR., *Assistant Examiner.*